May 17, 1927.
J. A. GRAY
FISH EVISCERATOR
Filed June 16, 1925
1,628,968
2 Sheets-Sheet 1
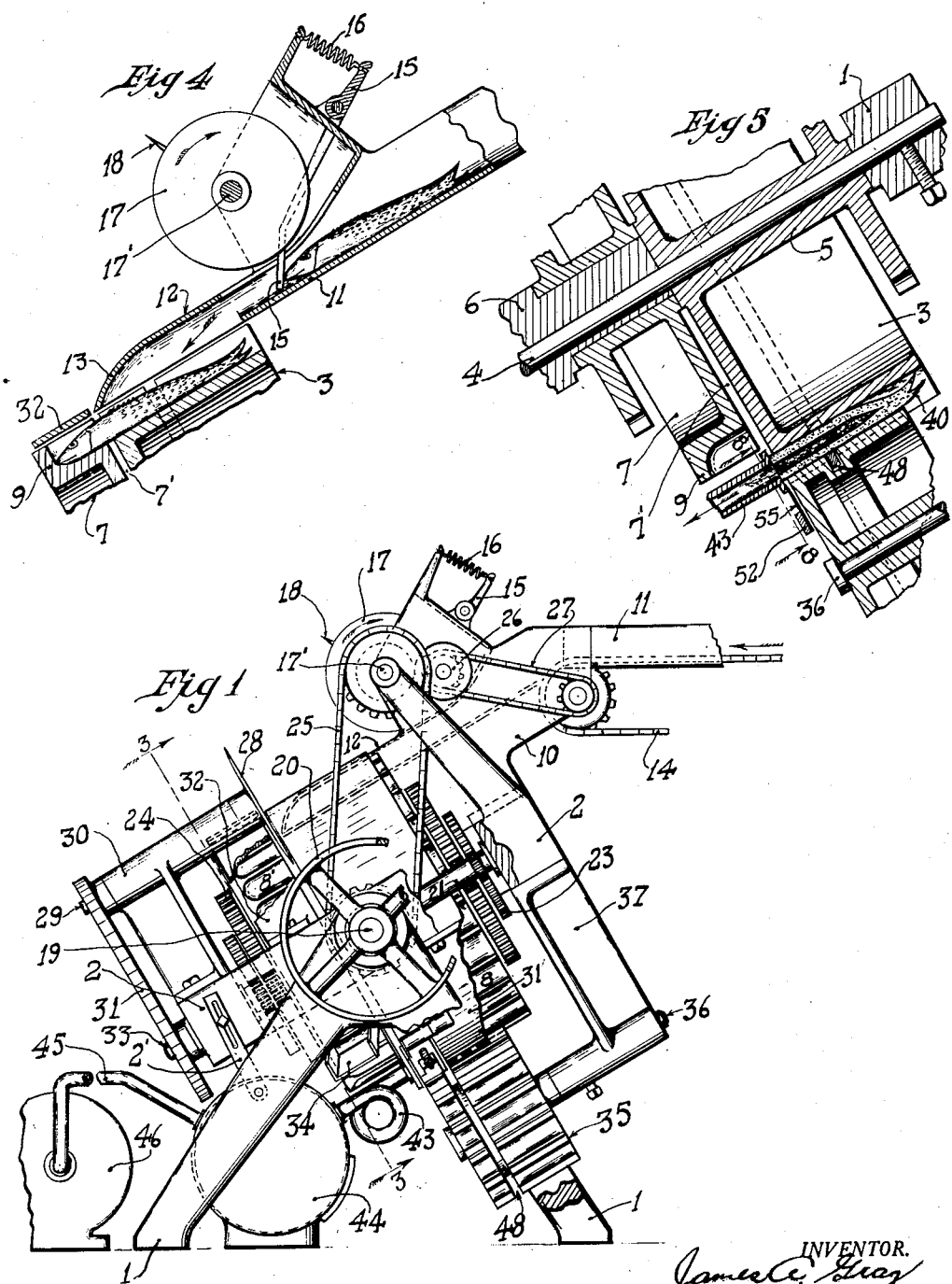

May 17, 1927. 1,628,968
J. A. GRAY
FISH EVISCERATOR
Filed June 16, 1925 2 Sheets-Sheet 2
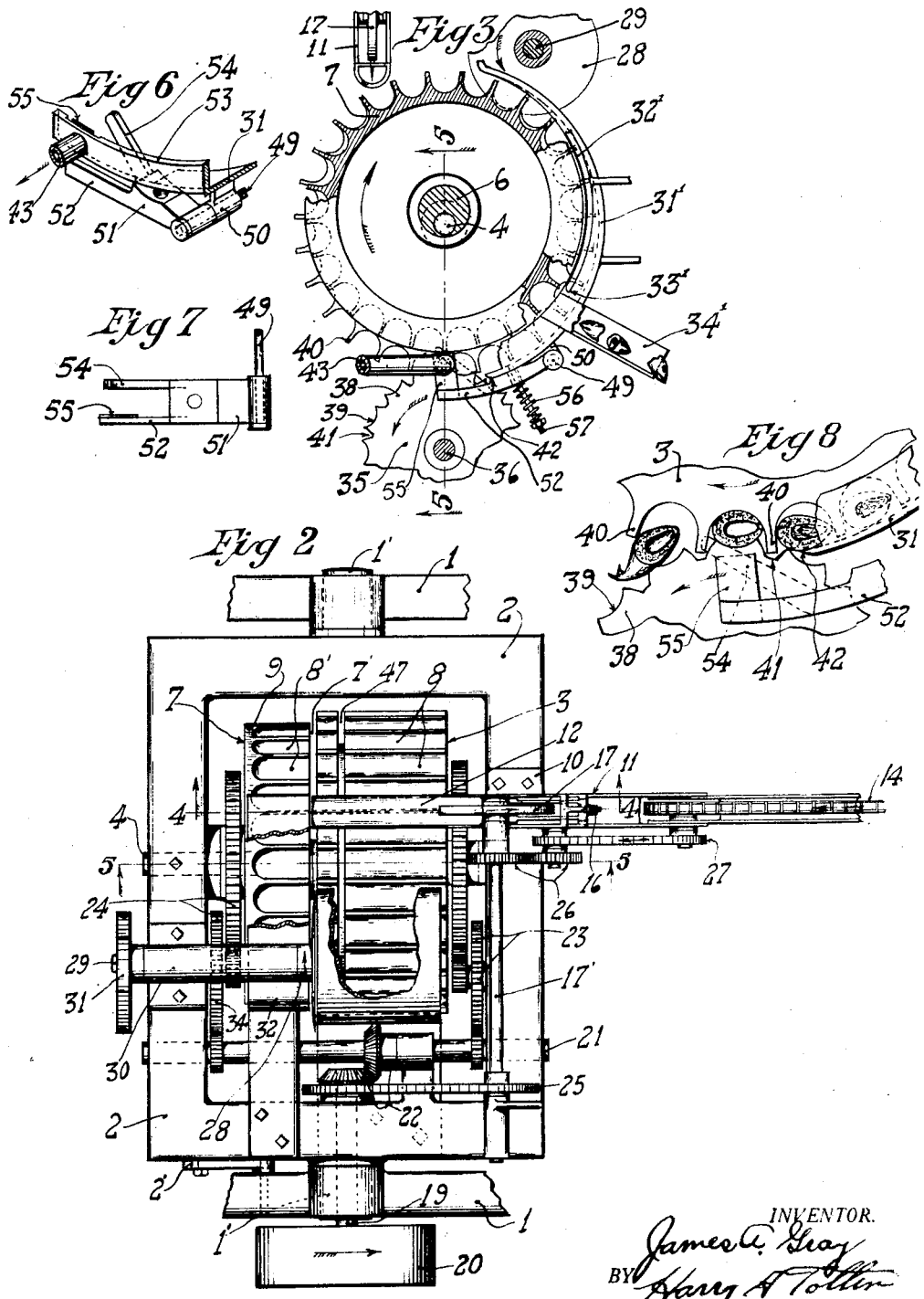

Patented May 17, 1927.

1,628,968

UNITED STATES PATENT OFFICE.

JAMES A. GRAY, OF SAN FRANCISCO, CALIFORNIA, ASSIGNOR TO AMERICAN CAN COMPANY, OF SAN FRANCISCO, CALIFORNIA, A CORPORATION OF NEW JERSEY.

FISH EVISCERATOR.

Application filed June 16, 1925. Serial No. 37,441.

The invention relates to an apparatus for the cutting and cleaning of fish particularly sardines for sanitary canning, and more particularly to the severing of a portion of the fish, preferably the head from the main body portion to expose the entrails, and the removing of the entrails through the cut portion preferably by air under pressure. Another point is in the automatic feeding in timed relation of fish to be cut endwise longitudinally into successive channeled holding devices on their registering with the feeding means.

The invention primarily consists in an automatic apparatus of the endless conveyer type longitudinally into channeled holding devices of which the fish to be cut and cleaned are delivered endwise, preferably head first in timed relation to the operation of the conveyer, are moved into the sphere of a cutting apparatus which severs one portion therefrom preferably the head exposing the entrails, the cut end of the fish being next held in position in the holding device and presented to an entrail removing means in the form of an air pressure device, which removes the entrails from the fish through the cut portion, the severed portion of the fish having been conveyed from the apparatus shortly after its severance. The particular construction, arrangement and operation in timed relation of mechanical parts renders the apparatus exceedingly efficient both from the point of the number of attendants required, from the point of sanitation, and from the point of the great quantity of fish treated at any given time over that treated during a similar period by machines at present devised. The invention further consists in the combination, arrangement and operation of parts set forth in the embodiment of the invention illustrated and described in the following specification, and particularly pointed out in the claims thereof.

Referring to the drawing disclosing one embodiment of the invention:—

Fig. 1 is a view in side elevation of one form of apparatus.

Fig. 2 is a view in top plan of the apparatus illustrated in Fig. 1.

Fig. 3 is a broken transverse sectional view taken on line 3—3 of Fig. 1.

Fig. 4 is a longitudinal sectional view of the feed mechanism illustrating one of the holding devices aligning therewith, and taken on line 4—4 of Fig. 2 of the drawings.

Fig. 5 is a view through the carrier on line 5—5 of Fig. 3 illustrating a cut fish positioned within the holding device and operating the air line controlling valve and with the cut portion in alignment with the air line.

Fig. 6 is a view in detail perspective of the valve for controlling the air line.

Fig. 7 is a plan view of the same valve.

Fig. 8 is a fragmentary detail sectional view taken on line 8—8 of Fig. 5.

In the drawings wherein like characters of reference designate corresponding parts in the several views 1 are the substantially inverted V-shaped supporting frame members disposed upwardly in parallel relation and in the upper ends of which are fulcrumed the trunnions $1^1$ extending from the opposite ends of an open elongated rectangular frame 2, the surface of which is preferably disposed at an incline to the horizontal with one side edge raised above the other, the frame being held in this inclined adjusted position by a tie member $2^1$, Fig. 1.

An endless channel holding device in the form of a cylinder or drum 3 is rotatably mounted in the frame 2 on the shaft 4 disposed transversely across the frame, the shaft passing through the hub 5 of the cylinder. An eccentric bushing 6 carried by one end of the shaft 4 affords a thrust bearing for one end of the hub 5, and on the bearing surface of which is rotatably mounted a second cylinder or narrow drum 7, one face of which is spaced from the face of the cylinder 3 affording a recess or slot $7^1$ between the same (Fig. 2). The cylinders are peripherally pocketed at 8 and $8^1$, the pockets extending transversely of the surface of the respective cylinders in parallel relation. The opposite ends of the pockets 8 and the inner ends of pockets $8^1$ are open and the outer ends of pockets $8^1$ are closed by an upstanding wall or flange 9 providing a limiting means or stop. The cylinder 7 is of a smaller diameter than that of cylinder 3 Fig. 3, and the same is so mounted relative to the cylinder 3 by the arrangement of bushing 6 that at one point preferably that point diametrically above the shaft 4, their peripheries and pocket walls align. This arrangement enables the periphery of cylinder 3 at a point diametrically below the shaft 4 to clear or project below the periphery of cylinder 7 as is clearly illustrated in Fig. 3. The peripheries of wheels 3 and 7 are, due to the adjustment of the frame 2, at an incline to the horizontal, which position facilitates the feeding of fish endwise into the aligned pockets by the hereinbefore described mechanism. Carried by a supporting arm 10 is a tubular feed trough 11 extending laterally from the high side of cylinder 3 at a point above the shaft 4, the trough being inclined to the horizontal corresponding to the inclination of the peripheries in the cylinders. The discharge end of trough 11 terminates in a head 12 (Fig. 4) of a length to overhang the width of cylinder 3, the forward end of the head being downwardly curved at 13 to guide the fish downwardly into the pocket $8^1$ aligning with pocket 8 of the drum 3. An endless conveyer 14 of suitable construction communicates with the receiving end of trough 11 and delivers fish endwise, preferably head first thereto, the fish preferably moving by gravity in a single line with the first fish in line abutting against the yieldable forked stop 15, the lower end of which is maintained by spring 16 to normally obstruct the free passage of the fish by gravity from the discharge end of trough 11 (Fig. 4). A transfer disk or member 17 carried by a rotatable shaft $17^1$ disposed transversely above the trough 11 extends between the tines of the stop 15, as in Fig. 4. An impaling spike 18 is carried by transfer member 17 and on each complete revolution of the member 17 the spike engages the head end of the foremost fish and moves the same from beneath the stop 15 and transfers the same by a projecting movement endwise from the discharge end of the trough 11 into the aligned holding devices 8 and $8^1$ which are at this time in alignment therewith. The rapidity of movement or projection of the fish during its transfer from trough 11 is sufficient to cause the head end thereof to be received within the holding device $8^1$, and to contact with the stop 9, the fish being guided thereonto by the curved head portion 13.

The cylinders 3 and 7, conveyer 14, and transfer member 17 with its longitudinally disposed impaling spike 18 are operated in relatively timed relation preferably by the following mechanism. A shaft 19 mounting at one end a band wheel 20 is rotatably mounted in one of the trunnions $1^1$ and the same operates through beveled gears 22 a countershaft 21 journaled at its ends in the frame 2.

The countershaft through separate gear trains 23 and 24, which take off from the opposite ends thereof, drives the respective cylinders 3 and 7 in the same direction and at the same speed. An endless chain drive 25 from shaft 19 transmits power to the shaft $17^1$ to operate the transfer member in the direction of the arrow, Fig. 1, and through a drive connection of intermeshing gears 26 and endless chain 27, the endless fish conveyer is operated in the direction of the arrow, Fig. 1, from shaft $17^1$.

A cutting device for severing the end of the fish lying in the pocket or channeled holding device $8^1$ from that portion of the fish lying in the pocket or channeled holding portion 8 is illustrated in the form of a rotating cutter 28, carried on the end of a shaft 29 rotatable within a bearing sleeve 30 mounted on one side wall of the frame 2. The cutter 28 is rotated in the direction of the arrow, Figs. 2 and 3, by an intermeshing connection 31 between its shaft and a shaft 33 mounting the gear 34 in the gear train 24. The cutting device is of a diameter sufficiently large to project into the slot $7^1$ at a point to one side of the trough 11. As the fish lying within the aligned pockets or channel holding devices 8 and $8^1$ of the respective drums illustrated in Fig. 4, are conveyed by the rotation of the drums from the trough 11 they pass within the sphere of the cutting device 28 which severs the fish transversely admitting of the main or body portion remaining in the pocket or channeled holding device 8, the end or head portion remaining in the channeled holding device or pocket $8^1$. This operation exposes the entrails at the cut end portion of the fish and the continued rotation of the cylinders presents the cut end of the main body portion of the fish retained in the pockets or channeled holding device 8 of the cylinder 3 to an entrail removing or withdrawing means hereinafter described. To ensure the retaining of the several fish portions in their respective holding pockets until such time as they are to be released therefrom, a curved guard plate $31^1$ (Fig. 3) is positioned to extend in close proximity to the periphery of cylinder 3 from the cutting device 28 to a point just to one side of a point directly below the shaft 4, and a second curved guard plate $32^1$ extends in close proximity to the periphery of the cylinder 7 from a point in advance of the cutting device 28 to a point $33^1$ where the periphery of the cylinder 7 aligns with the base of the pockets or channeled holding devices 8 of the cylinder 3. At this point an inclined chute or trough $34^1$ extends from the periphery of cylinder 7, and in the trough are deposited by the rotation of the cylinder 7 the fish head portions severed from the main body portions by the cutting device 28.

It will be observed that access may be had to the inner end of the channeled holding devices or pockets 8 after the same pass below the trough 34¹, as below this point the periphery of cylinder 7 falls short of registering with the periphery of cylinder 3, due to the eccentric mounting of cylinder 7 about the shaft 4.

To ensure the proper locating of the main body portions of the fish within their respective pockets or channeled holding devices, an endless fish positioning means in the form of a peripherally serrated wheel 35 (Fig. 3) is rotatably mounted on a shaft 36 supported by an arm 37 depending from the under side of the main frame 2, Fig. 1. The serrations in the periphery of the member 35 are in the form of transversely extending teeth 38, each provided in its outer face with a depression 39, which with the outline of the base of the pocket or channeled holding devices substantially complete the outer contour of the main fish body (Fig. 8) held within the pocket 8. These teeth 38 intermesh with the pockets 8, the pocket walls 40 being received in depressions 41 in the member 35 between the teeth 38. The teeth are of sufficient length to intermesh only a slight distance within the pockets 8 as illustrated in Fig. 8 of the drawings, and are received within the pockets immediately on the movement of the pockets from the lower end 42 of the guard 31¹. At the point of alignment of pockets 8 and teeth 38 with aligned intersecting shafts 4 and 36, an air pipe 43 communicates by its end port with the inner ends of successive pockets as the same pass this point, and the end of said pipe lies in close proximity to the exposed cut entrail retaining portion of the fish. The pipe 43 is or may be stationary in the sense that the pockets 8 arrive at it successively, but the pipe need not be immovable. The pipe 43 communicates with a tank 44 and from said tank extends a second pipe 45 connected with an air pressure means 46, preferably of the suction (negative pressure) type. It will thus be observed that on the alignment of the cut portion of the fish with the air pipe 43, air suction within the pipe will remove the entrails from the fish, the fish body being collapsed by atmospheric pressure, and cause the same to deposit in the tank 44.

The entrail removing means is so controlled that the end of pipe 43 is closed at all times except when one of the channeled holding devices containing a cut fish registers therewith, and at this time is momentarily uncovered to admit of air suction at the end of the pipe to withdraw the entrails through the cut portion of the fish, and one form of mechanism for accomplishing this result is constructed as follows:—

The cylinder 3 and the member 35 are each provided with respective circumferential grooves or recesses 47 and 48 disposed in alignment, the groove 47 transversely intersecting the pockets or channeled holding devices 8 of cylinder 3. Fulcrumed on a shaft 49 in an arm 50 depending from the underside of the lower end of the guard 31¹ is one end of a body portion 51 of a structure, the outer end of which is bifurcated or slotted to provide a valve plate mounting arm 52 disposed parallel with the flanged edge 53 of guide plate 31¹, and an annularly disposed valve operating arm 54 arranged for reception in the channels 47 and 48. The arm 52 carries a valve plate 55 which covers and closes the inlet end of pipe 43, as in Fig. 6. A spring 56 coiled about the guide rod 57 bears on the member 51 to normally maintain the plate 55 in pipe closing position. On the successive registering of the channeled holding devices or pockets 8 of the cylinder 3, the body of the fish contained therein rides on the arm 54 depressing member 51 against the action of spring 56, and when the fish align with the end of pipe 43, the plate 55 is completely removed from the end of the pipe admitting of the full suction pressure to act on the cut portion of the fish to remove the entrails therefrom. The arm 54 when depressed in this manner is received in the groove 48 in member 35 (Fig. 5). Should the successive pockets in their movement not contain fish, the upper end of arm 54 will continue to ride in groove 47 and the inlet end of pipe 43 will remain closed by plate 55.

It will be observed that in this present machine, the feeding, cutting and operation of removing the entrails from the fish are entirely automatic, and the parts are so constructed and arranged as to operate in timed relation to afford the most efficient results.

I claim:—

1. A fish cutting and cleaning apparatus comprising a movable fish carrier, means for retaining the positioned fish thereon, means for successively acting on the positioned fish to cut the same to expose the entrails, air pressure means with which the cut fish are successively aligned for acting thereon to remove the entrails therefrom, and means actuated by the cut fish on aligning with the air pressure means for controlling its operation.

2. A fish cutting and cleaning apparatus comprising an endless series of channeled holding devices, a cutting device adjacent the path of one end of said devices, fish-holding means with which corresponding ends of said channeled holding devices successively align, a transfer means associated with said feeding means for engaging and transferring fish successively from the feeding means endwise longitudinally into successive holding devices, and air pressure means with which corresponding ends of said holding devices successively align.

3. A fish cutting and cleaning apparatus comprising a rotatable, peripherally pocketed carrier drum, means for feeding fish successively to said pockets with an end projecting beyond the end of the drum, means for rotating the drum, means for retaining the positioned fish within their respective pockets during the partial rotation of the drum, means for cutting the projecting portion of successive fish from the remainder to expose the entrails, and air pressure entrail removing means having a stationary port with which the cut portion of the fish held by the drum successively register.

4. A fish cutting and cleaning apparatus comprising a rotatable pocketed carrier drum, means for feeding fish endwise into successive pockets with one extremity of the fish projecting beyond the end of the carrier, stop means for limiting the projection of the fish extremities from the carrier end, cutting means with which the fish successively coact for cutting the projecting portion from the main portion to expose the entrails, means for receiving and conveying the cut projecting fish portion from the apparatus, means for retaining the main fish portion within the respective pockets, and air pressure entrail removing means having a stationary port with which the cut end of the main portion of the fish held by the drum successively register.

5. A fish cutting and cleaning apparatus comprising a rotatable carrier drum, including a pair of peripherally pocketed members of different diameters arranged in end to end relation, means for mounting said members for rotation on offset axes with their peripheries at one point in alignment, means for rotating said members, fish cutting means operatively projecting inwardly between the adjacent ends of said means, and air pressure means with which corresponding ends of successive pockets of one of said members successively register.

6. A fish cutting and cleaning apparatus comprising a rotatable carrier drum, including a pair of peripherally pocketed members of different diameters arranged in end to end relation, means for mounting said members for rotation on offset axes with their peripheries at one point in alignment, means for rotating said members to position the pockets thereof at the point of peripheral alignment in register, means for feeding fish into successively aligning pockets with a portion of the fish received in the pocket of each member, fish cutting means operatively projecting inwardly between the adjacent ends of said members, and air pressure means with which the cut portions of the fish are caused to successively register.

7. A fish cutting and cleeaning apparatus comprising a movable carrier including a pair of parallel moving conveying members provided with pockets designed for registering in end to end relation for a portion of movement of said conveying members, means for positioning a fish within said pockets during their registering with the portion of the fish in each pocket, means operatively projecting between the registering ends of the pockets for cutting the pocketed fish transversely to expose the entrails and with one portion lying in each registering pocket portion, means for operating said conveyers to cause said pocket portions to move out of register, and air pressure means with which corresponding ends of one series of pocket portions successively register.

8. A fish cutting and cleaning apparatus comprising a rotatable carrier provided with fish receiving pockets for successively registering with the feeding means, said carrier comprising a pair of members mounted for rotation on offset axes, means for delivering fish from the feeding means to successive pockets, cutting means to which the fish are successively presented by the movement of the carrier, and means with which the cut fish successively cooperate for removing the entrails endwise of the fish through its cut portion.

9. A fish cutting and cleaning apparatus comprising a movable carrier, provided with a series of elongated channeled holding devices for receiving the fish to be cut and cleaned, means with which corresponding ends of holding devices successively register, and through which fish are fed endwise longitudinally into said holding devices on their successive registering therewith, means within the path of the carrier for cutting the fish transversely to sever a portion therefrom and to expose the entrails, and stationary means with which the ends of the cut fish portions successively align for removing the entrails therefrom through the cut portion.

10. A fish cutting and cleaning apparatus comprising an endless series of channeled holding devices, feeding means for delivering successive fish endwise longitudinally into successive holding devices on their successive alignment therewith, means movable with the holding devices for limiting the movement of the fed articles longitudinally of their respective holding devices, a cutting device adjacent to the path of one end of said holding device, and a pressure means having a stationary port with which corresponding ends of said holding devices successively align.

11. A fish cutting and cleaning apparatus comprising an endless series of channeled holding devices intersected by an endless channel $7^1$ extending transversely thereof, a cutting device adjacent to the path of one end of said holding device, air pressure means with which corresponding ends of successive holding devices successively register, a valve for controlling said air pressure means, and an arm controlling said valve and receivable in said endless channel.

12. A fish cutting and cleaning apparatus comprising an endless series of channeled holding devices, a fish cutting device adjacent to the path of one end of said holding devices, air pressure means having a stationary port with which corresponding ends of successive holding devices successively register, and positioning devices for reception within said holding devices on their registering with said air pressure means.

13. A fish cutting and cleaning apparatus comprising an endless series of channeled holding devices, a fish cutting device adjacent to the path of one end of said holding devices, air pressure means having a stationary port with which corresponding ends of successive holding devices successively register, and an endless series of fish positioning devices for reception within said holding devices on their registering with said air pressure means.

14. A fish cutting and cleaning apparatus comprising an endless series of channeled holding devices, a cutting device adjacent to the path of one end of said holding devices, an air suction pipe with which corresponding ends of successive holding devices successively register, a valve controlling the air passage through said pipe, and means for operating said valve in accordance with the filled or empty condition of the holding devices in register with said pipe.

15. A fish cutting and cleaning apparatus comprising an endless series of channeled holding devices, a cutting device adjacent to the path of one end of said holding devices, an air suction pipe with which corresponding ends of successive holding devices successively register, a valve controlling the air passage through said pipe, and means associated with the valve and cooperating with the contents of a filled receptacle registering with the pipe to cause said valve to open.

16. A fish cutting and cleaning apparatus comprising an endless series of channeled holding devices, a channeled feeding member disposed laterally at one side of said series of holding devices and successively into register with which said holding devices are adapted to move, fish retarding means within said feeding member, fish transfer means associated with the feeding means for successively engaging a fish therein and for transferring the same endwise into a holding device, means associated with the holding devices for cutting the fish to expose the entrails, and means for removing the entrails of the fish through its cut portion.

17. An apparatus for cutting and cleaning fish comprising means for cutting the fish to obtain access to the interior thereof, relatively stationary means for withdrawing the entrails through the cut portion of the fish, means for carrying and presenting the fish successively to the cutting and entrail withdrawing means, and means for mounting the apparatus and capable of adjustment to dispose the elements thereof horizontally or at an incline thereto.

18. A fish cutting and cleaning apparatus comprising a movable carrier including a pair of parallel moving carrier members provided with pockets designed for registering in end to end relation for a portion of the movement of said conveying members, said pockets adapted when in registry for receiving a fish with a portion of the fish in each pocket, means projecting between the registering ends of the pockets for cutting the pocketed fish transversely, means for operating said conveyers to cause said pocketed portions to move out of register after said cutting operation, with a portion of the cut fish carried in one pocket portion, and means for acting on the fish after cutting for removing the entrails thereof through the cut portion.

19. A fish cutting and cleaning apparatus comprising a movable carrier including a pair of parallel moving conveying members provided with pockets adapted for registering in end to end relation for a portion of the movement of said conveying members, means for operating said conveyers to cause said pocket portions to move out of register, and cutting means projecting between the ends of the pockets during their registering.

20. A fish cutting and cleaning apparatus comprising a movable carrier including a pair of parallel moving conveying members provided with pockets adapted for registering in end to end relation for a portion of the movement of said conveying members, means for operating said conveyers to cause said pocket portions to move out of register, cutting means projecting between the ends of the pockets during their registering, and feeding means for delivering articles endwise to the pockets in advance of said cutting means.

21. The combination of an endless conveyer having means for confining a succession of fish thereon, yielding means for arresting the foremost fish, propelling means for advancing the foremost fish past and overcoming the resistance of said arresting means, a rotary carrier having fish-holding channels, means for decapitating the fish in said channels, and mechanism for actuating said propelling means and carrier whereby the fish are deposited successively in successive channels of the carrier.

In testimony whereof I have signed my name to this specification.

JAMES A. GRAY.